United States Patent Office 3,324,765
Patented June 13, 1967

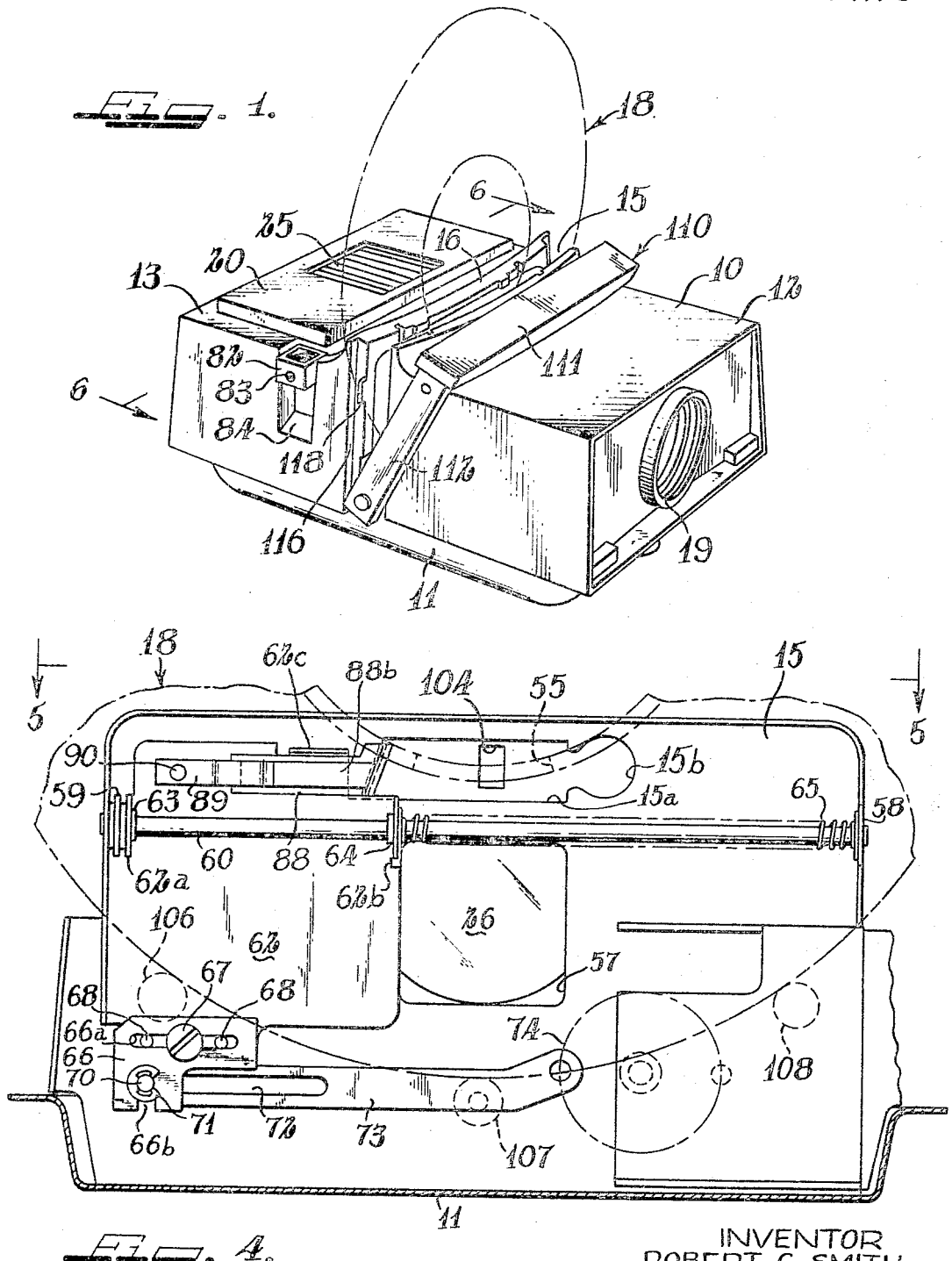

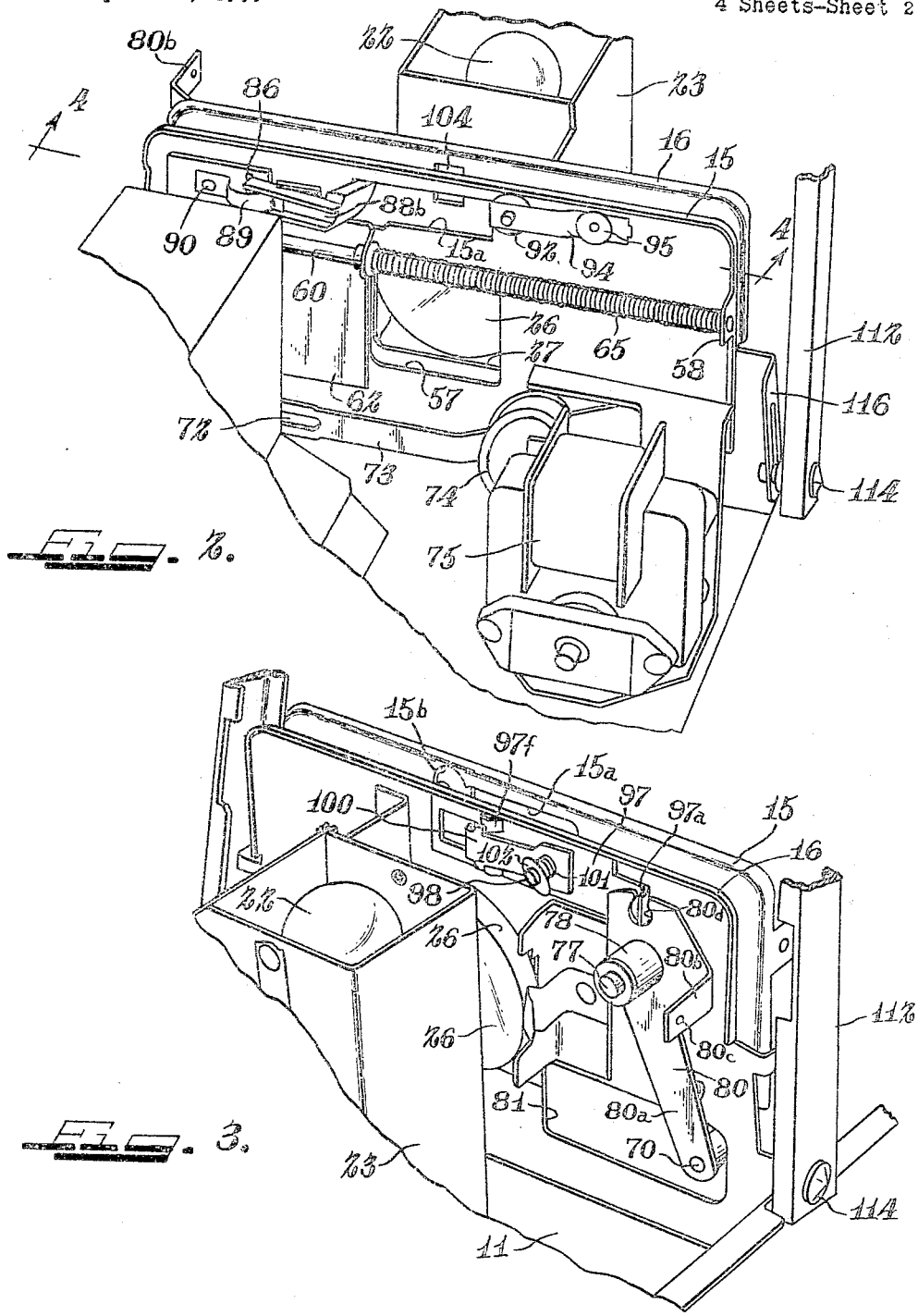

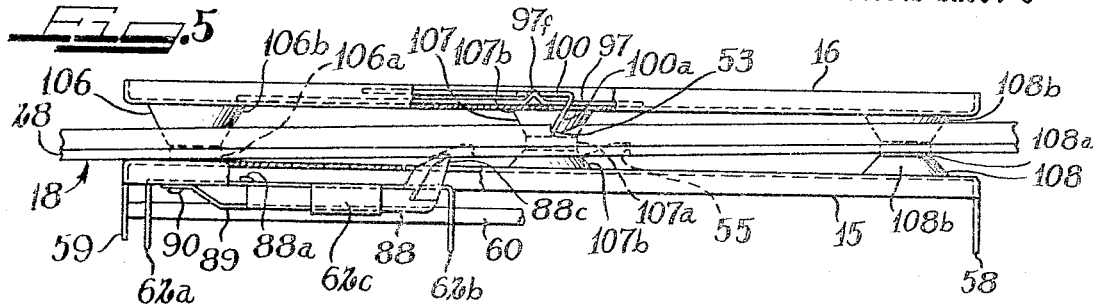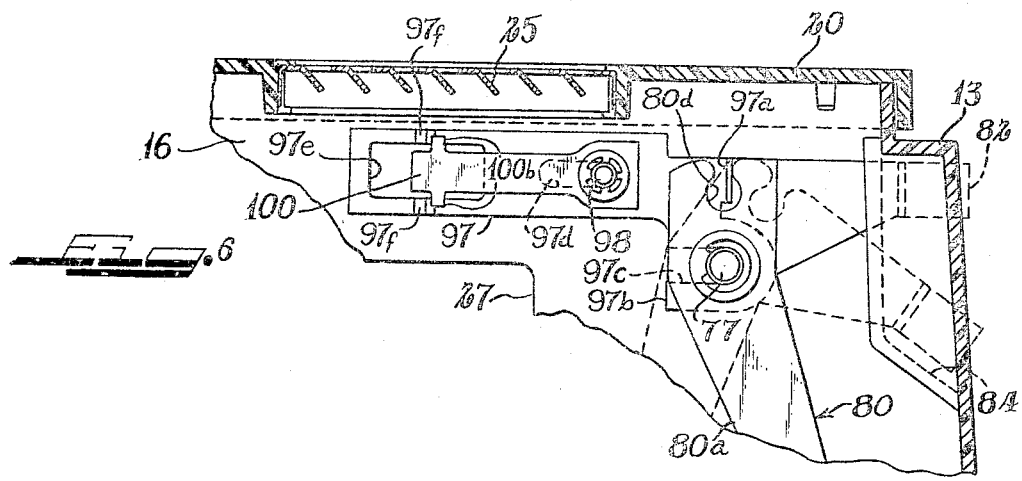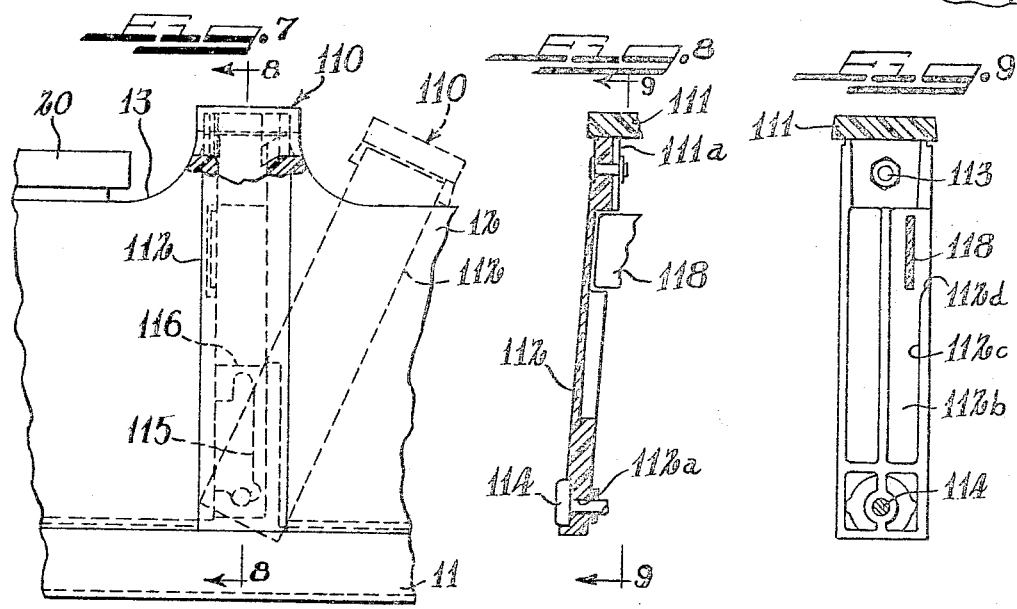

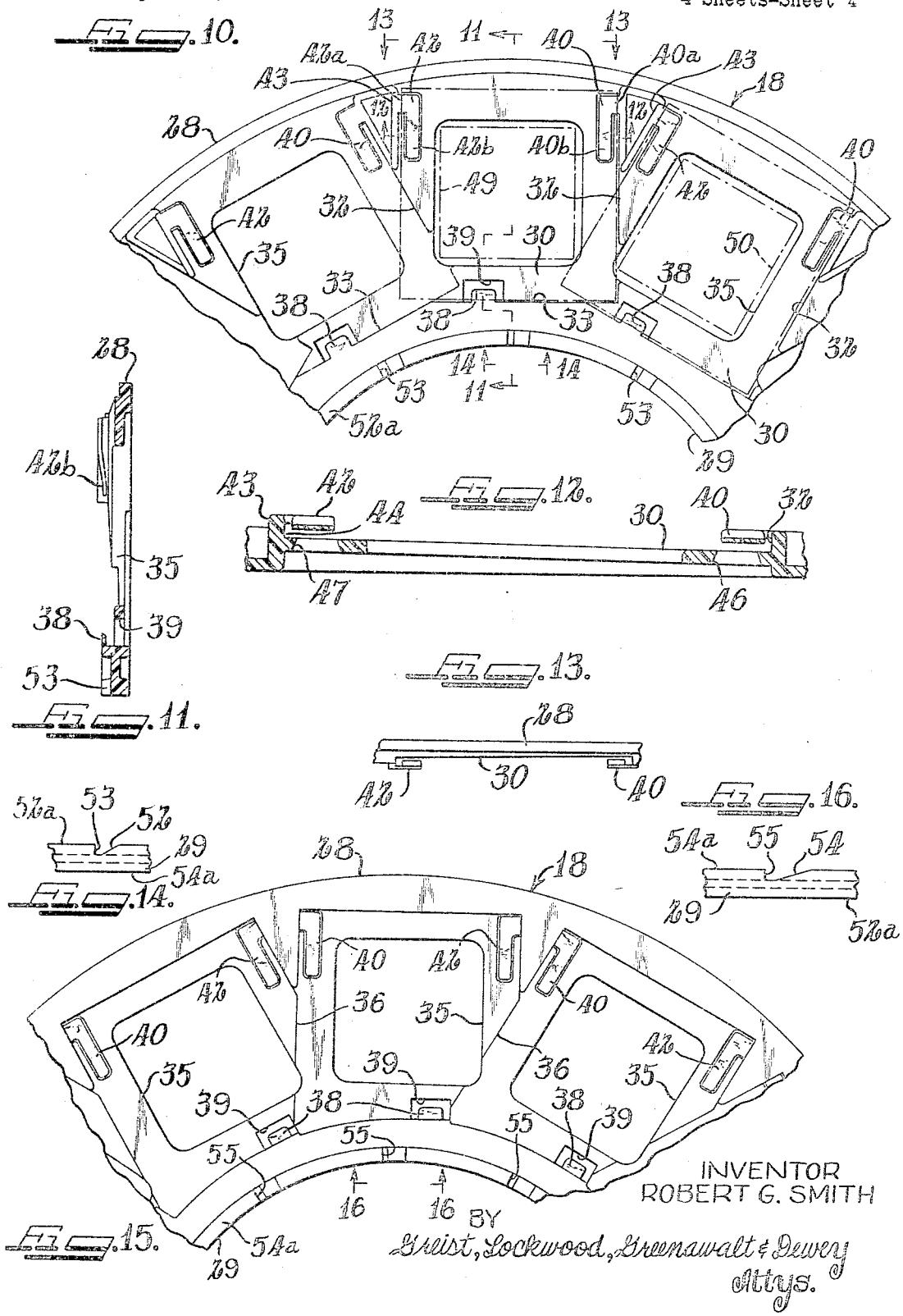

3,324,765
SLIDE PROJECTOR AND SLIDE CARRIER THEREFOR
Robert G. Smith, Chicago, Ill., assignor, by mesne assignments, to General Aniline & Film Corporation, New York, N.Y., a corporation of Delaware
Filed Apr. 29, 1965, Ser. No. 451,889
12 Claims. (Cl. 88—27)

ABSTRACT OF THE DISCLOSURE

The slide carrying disk consists of an annular member adapted to mount a plurality of photographic slides in corner overlapping relation. To this end, one face of the disk includes a plurality of planar surfaces each being inclined the same amount from a common plane containing the disk. Three yieldable tabs, formed integral with the disk, are located adjacent each of the planar surfaces for engagement with marginal portions of a slide thereby to hold a slide against the associated planar surface with a corner of such slide overlapping a corner of the adjacent slide. The disk includes circumferential series of gear teeth adapting the same to be indexed, i.e., rotated about its central axis.

The projector for the disk includes a housing having a pair of vertical, parallel plates which define a slot intermediate the housing. This slot opens at the top thereof and also opens at opposite sides of the housing. Support means are provided within the slot for engagement with the periphery of the disk thereby to mount the same in generally vertical plane. The aforesaid plates each include an aperture along the optical axis of the projector, which apertures define the projection gate. Indexing means are provided for rotating or indexing the disk thereby to advance the slides seriatim to the projection gate. The aforesaid housing plates are inclined with respect to the optical axis of the projector thereby to mount the disk such that the slide being projected is in a plane perpendicular to the optical axis.

---

This invention relates to projectors for film slides, and more particularly to a new and improved slide projector and an associated slide carrying disk.

It is a primary object of the present invention to provied a slide projector including unique construction for supporting and rotating a slide carrying disk having means for mounting a plurality of film slides in generally coplanar relation.

Another object of the present invention is the provision of a slide projector of the type described, which projector includes a slot for receiving a slide carrying disk, and which projector further includes a carrying handle movably mounted for covering and uncovering the slot.

Still another object of the present invention is the provision of the combination of a slide projector and a slide carrying disk adapted to mount a plurality of film slides in corner overlapping relation, wherein the projector includes unique means in supporting engagement with the periphery of the disk for supporting the same in a substantially vertical plane and canted or tilted about a vertical axis so that a slide being projected occupies a plane perpendicular to the optical axis of the projector.

Even another object of the present invention is the provision of a slide carrying disk having unique means for mounting a purality of film slides in corner overlapping relation.

A further object of the present invention is the provision of a slide carrying disk of unitary construction for mounting a plurality of slides in circumferential relation and also in corner overlapping relation, which disk includes integral tabs adapted for yieldable engagement with the film slides.

These and other objects and advantages of the invention will become apparent from the following specification disclosing a preferred embodiment which is illustrated in the accompanying drawings wherein:

FIG. 1 is a perspective view of the slide projector showing the top, front and right hand side thereof, and also showing the outlines of the slide carrying disk in phantom lines;

FIG. 2 is an enlarged, fragmentary, perspective view of the projector (with the housing thereof removed) looking from front to rear;

FIG. 3 is an enlarged, fragmentary, perspective view of the projector (with the housing thereof removed) looking generally from the rear to the front of the projector;

FIG. 4 is an enlarged section taken generally along the line 4—4 of FIG. 2 and showing the lower portion of the slide carrying disk in phantom lines;

FIG. 5 is a view taken along the line 5—5 of FIG. 4 and showing a fragmentary portion of the disk in solid lines;

FIG. 6 is a fragmentary, enlarged section taken generally along the line 6—6 of FIG. 1;

FIG. 7 is an enlarged, fragmentary, elevational view of the right hand side of the projector with the carrying handle of the projector being shown in full lines in its slot closing position and being shown in broken lines in its position wherein the slot is uncovered for reception of the slide carrying disk;

FIG. 8 is a section taken along the line 8—8 of FIG. 7;

FIG. 9 is a section taken along the line 9—9 of FIG. 8;

FIG. 10 is an enlarged, fragmentary, rear elevational view of the slide carrying disk;

FIG. 11 is a section taken along the line 11—11 of FIG. 10;

FIG. 12 is an enlarged section taken along the line 12—12 of FIG. 10;

FIG. 13 is a view taken along the line 13—13 of FIG. 10;

FIG. 14 is an enlarged view taken along the line 14—14 of FIG. 10;

FIG. 15 is an enlarged, fragmentary, front elevational view of the slide carrying disk; and FIG. 16 is a view taken along the line 16—16 of FIG. 15.

Referring to the drawings, the projector will be seen to include a housing 10 including a base 11 generally in the form of a pan. The housing actually consists of front and rear housing portions 12 and 13, respectively, which housing portions are separated by front and rear plates 15 and 16, respectively; plates 15 and 16 extend transversely to the optical axis of the projector in parallel spaced relation and define a slot for reception of the slide carrying disk 18. Front housing portion 12 includes a circular opening in the front wall thereof for slidably receiving a cylindrical lens housing 19. Rear housing portion 13 includes a detachable cover plate 20 for access to a lamp 22 (FIGS. 2 and 3), which lamp is mounted within a lamp housing 23. Cover 20 includes a louvered portion 25 permitting ventilation of the lamp housing. A motor driven fan (not shown) is associated with lamp 22 for cooling the latter in a manner well known in the art.

As noted in FIGS. 2 and 3, plate 16 mounts a lens 26 in front of lamp 22 (a suitable opening is provided in the front wall of lamp housing 23). Plate 16 includes a generally rectangular aperture 27 adjacent lens 26. It will be understood that lens 26 and the lens or lenses in lens housing 19 define the optical axis of the projector. Suitable means (not shown) are provided for adjusting the lens housing 19 axially thereby to provide a focusing means. The means in the projector for projecting film slides, i.e. the light source, the blower, the lenses, etc., are not described in detail as they are well known by those skilled in the art and form no part of the present invention.

The slide carrying disk 18 of this invention is illustrated in FIGS. 10–16. The disk is of unitary construction preferably molded from a suitable plastic, and has its periphery defined by a continuous annular surface 28. The disk includes a central opening defined by a continuous annular surface 29. The rear face or side of the disk (FIG. 10) includes a plurality of planar surfaces 30 which are equally spaced circumferentially of the disk. These planar surfaces are uniformly inclined from the plane of the disk about respective radii of the latter and also intersect each other thereby forming non-radial ledges 32 and other ledges 33 which are perpendicular to the non-radial ledges. Midportions of ledges 33 intersect respective radii of the disk at right angles with the latter. The ledges 32 and 33 have their faces or surfaces extending in perpendicular relation with the plane of the disk, i.e. planes containing the surfaces of the ledges are at right angles with a plane containing the disk.

Each planar surface 30 has formed therethrough a generally rectangular aperture 35. In the embodiment of the slide carrying disk shown for purposes of illustration, the slide carrying disk includes twelve apertures and associated planar surfaces. Each aperture 35 has its side edges in parallel relation with the associated ledge 32 and its other edges in parallel relation with associated ledge 33. It will be noted that each aperture 35 has one corner thereof in adjoining relation with one of the ledges 32. As seen in the drawings, the disk is of thin wall construction and molded in such a manner that the front side or face of the disk (FIG. 15) includes ledges 36 which are in alignment with respective ledges 32 on the rear face of the disk.

The slide carrying disk includes a plurality of integral tabs associated with each planar surface 30 for mounting a film slide against the latter. In the embodiment shown for purposes of illustration, three tabs are associated with each planar surface 30. As best seen in FIGS. 10 and 11, each planar surface 30 has an inner tab 38 extending integrally from the associated ledge 33. Because of the construction of the molds used in forming the slide carrying disk, each planar surface 30 includes a rectangular opening 39 adjacent the associated tab 38.

The slide carrying disk includes a pair of integral, outer tabs associated with each planar surface 30. One of such tabs is designated 40 and is formed adjacent the associated ledge 32. Tab 40 includes a short leg portion 40a extending from the adjacent ledge 32 and a right angle portion 40b which extends in general parallel relation with ledge 32 and in spaced relation from the associated planar surface 30. The other upper tab is designated 42 and is identical but opposite hand with tab 40. Tab 42 includes a short leg portion 42a which extends integrally from a formation 43 also integral with the disk. As noted in FIG. 11, tab portion 42b is bent inwardly or toward the disk; this tab portion is adapted for yieldable sliding engagement with the marginal portion of a film slide. Formation 43 defines a shoulder 44 (FIG. 12) which faces the upper portion of the associated ledge 32 and extends in parallel relation with the latter. Due to the construction of the molds used in forming the slide carrying disk, the latter includes a pair of openings 46 and 47 (FIG. 12) adjacent respective tabs 40 and 42, which openings have a shape conforming with the outlines of the tabs.

A pair of conventional film slides are shown in phantom lines in FIG. 10 and are designated 49 and 50. It will be understood that the outer portion of slide 49 is held against one of the planar surfaces 30 by tab portions 40b and 42b. One corner of the adjacent slide 50 overlaps one corner of slide 49 thereby, among other things, permitting a maximum number of slides to be carried by the slide carrying disk. Inner tab 38 engages the inner marginal portion of slide 49. In like manner, another tab 38 engages the inner marginal surface of slide 50, which slide has one corner thereof overlapping adjacent slide 49. Therefore, each slide acts to aid in holding an adjacent slide in place by overlapping a portion of the same. It will be noted that each tab 38 is located to engage a slide near the corner thereof which overlaps the corner of the adjacent slide. The transparent film portions of slides 49 and 50 are of course in registry with the associated apertures 35 in the disk.

It will be understood that slides 49 and 50 illustrated are of conventional type, i.e., 35 mm. transparencies supported in cardboard frames. Of course, the invention is not to be limited for use with such slides as the disk can be adapted to support slides of varying sizes and slides having different mounting frames. It should be apparent that the slides are readily mounted on and removed from the slide carrying disk by sliding the film slides in directions which extend radially of the disk. It will be understood that although the slide carrying disk carries the slides in generally coplanar relation, because of the overlapping corner feature in mounting the film slides which is brought about by the arrangement of planar surfaces 30, actually the slides are uniformly tilted or canted from a common plane containing the disk.

Referring to FIGS. 10 and 14, the rear side of the disk includes an annular series of inclined indentations 52 formed in an annular surface 52a adjacent inner surface 29 of the disk. Each indentation 52 defines a tooth 53. It will be understood that teeth 53 correspond in number with the number of planar surfaces 30. The other side of the disk includes an annular series of similar inclined indentations 54 formed in an annular surface 54a; these indentations define a plurality of teeth 55. Again, it will be understood that teeth 55 are equal in number to the number of slide receiving planar surfaces 30.

Returning now to the slide projector itself, front plate 15 thereof will be seen to include a generally rectangular aperture 57 (FIG. 2) in registry with aperture 27 in plate 16. Plate 16 also includes integral ears 58 and 59 (FIG. 4) mounting opposite ends of a cross rod 60. A shutter plate 62 has a pair of ears 62a and 62b with aligned bores mounting bushings 63 and 64, respectively. These bushings are slidable on rod 60 and thereby mount the shutter plate for sliding movement transversely of the projector in parallel adjacent relation with the front surface of plate 15. A coil spring 65 encircles rod 60 and has opposite ends thereof in abutting engagement with ear 58 and shutter ear 62b thereby urging shutter 62 to the left as viewed in FIGS. 2 and 4.

A bracket 66 (FIG. 4) is mounted on the lower portion of shutter plate 62 by means of a screw fastener 67 which threadingly engages a bore in the shutter plate and is received in a horizontal slot 66a in the bracket. Shutter plate 62 includes a pair of integral protuberances 68 which slidably engage slot 66a. It will be apparent that bracket 66 is adjustably mounted on shutter plate 62. Bracket 66 includes a downwardly opening slot 66b which receives one end of a pin 70. This pin includes an annular groove receiving a split ring 71. Pin 70 passes through a slot 72 formed in one end of a crank arm 73, which crank arm has the other end thereof pivotally connected to a gear 74 adjacent the periphery of the latter. Gear 74 is driven by suitable means from a small electric motor 75 (FIG. 2). It will be apparent that upon energizing of motor 75, crank arm 73 will be horizontally reciprocated thereby to pull the shutter plate to the right as viewed in FIGS. 2 and 4; the shutter plate is not moved to the left by the crank arm because of the elongated slot 72 in the lattter. The shutter plate is moved to the left by coil spring 65.

Looking now to FIG. 3, housing plate 16 supports a pin 77, which pin in turn supports a cylindrical bushing 78. Bushing 78 pivotally supports a manual operating lever 80. This lever includes an integral depending arm portion 80a, which arm portion receives the other end of pin 70. Plate 16 includes a horizontally elongated opening 81 to permit movement of pin 70 and the members attached thereto. Arm 80a also includes an integral portion 80b which mounts an operating handle 82 (FIG. 1). Handle 82 is secured to lever portion 80b by means of a fastener 83 which threadingly engages an opening 80c in portion 80b. Rear housing portion 13 includes a suitable recess 84 to permit movement of operating handle 82. It should be apparent that downward movement of operating handle 82 causes closing of shutter 62, i.e. movement from left to right as viewed in FIGS. 2 and 4. The shutter is permitted to move upon depressing operating handle 82 because of the sliding engagement between pin 70 and arm 72. Of course, spring 65 returns the shutter to its open position, i.e. from right to left as viewed in FIGS. 2 and 4, when the operating handle 82 is released. In other words, operating handle 82 provides for manual operation of the shutter and also manual cycling for advancing the slide carrying disk as will become apparent hereinbelow.

The shutter 62 includes a vertically elongated opening 86 (FIG. 2) which receives a tab 88a (FIG. 5) integral with one end of a drive pawl 88. The drive pawl includes a U-shaped groove or recess 88b, which recess receives one end of a spring clip 89 having the other end thereof secured to the shutter plate by means of a fastener 90. The shutter includes an integral flange 62c in guiding engagement with the upper surface of drive pawl 88. It will be understood that the shutter mounts the drive pawl in such a manner that the latter is adapted to be deflected to one side of the shutter plate, namely to the front side thereof; in other words, spring 89 acts to hold the drive pawl 88 in yieldable engagement with shutter plate 62.

From FIGS. 2 and 4, it will be noted that pawl 88 has a driving tip 88c which extends through a horizontally elongated opening 15a formed in front housing plate 15. As seen in FIG. 3, opening 15a communicates with a generally circular opening 15b which receives a smoothly shaped knob-like member 92. Member 92 is yieldably held within opening 15b by means of a spring clip 94 (FIG. 2), which spring clip is secured against the front face of plate 15 by a suitable fastener 95.

Returning now to operating lever 80, the latter will be seen to include an upwardly opening recess 80d. This recess receives a tab 97a integral with a horizontally elongated plate 97. Plate 97 includes an integral portion 97b (FIG. 6) defining a horizontally disposed open ended slot 97c, which slot slidably receives pin 77. Plate 97 also includes an elongated slot 97d which slidably receives a fastener 98 having one end thereof suitably secured to housing plate 16. In other words, pins 77 and 98 mount plate 97 for limited, horizontal, reciprocal sliding movement adjacent the rear surface of housing plate 16. Plate 97 includes a horizontally elongated opening 97e, and plate 97 also includes integral raised portions 97f adjacent opposite sides of opening 97e.

A stop or catch pawl 100 includes an opening in one end thereof which receives fastener 98. A small coil spring 101 encircles fastener 98, which spring has one end thereof engaging pawl 100 and the other end thereof abutting a cap or washer 102 on the outer end of fastener 98. In other words, the spring 101 yieldably holds the catch pawl adjacent sliding plate 97. Stop pawl 100 includes an integral tip 100a (FIG. 5), which tip extends through an opening 104 in plate 15. Stop pawl 100 also includes a pair of oppositely extending, integral ears 100b, which ears are adapted to be engaged by raised portions 97f of plate 97 for lifting or disengaging the stop pawl 100 as will be explained below.

Referring now to FIGS. 4 and 5, plates 15 and 16 will be seen to mount guide members 106, 107 and 108 in circumferential spaced relation. Guide member 106 includes a cylindrical portion 106a secured adjacent housing plate 15. This guide member also includes an integral, coaxial, adjacent frusto-conical portion 106b, which frusto-conical portion has a larger end thereof suitably secured to plate 16. Guide member 107 includes a cylindrical central portion 107a having coaxial, integral, frusto-conical portions 107b at its opposite ends, which frusto-conical portions 107b have their larger ends suitably secured to respective plates 15 and 16. Guide member 108, which is similar to guide member 107, includes a central cylindrical portion 108a having integral, coaxial, frusto-conical portions 108b at its respective opposite ends, which frusto-conical portions have their larger ends suitably secured to respective plates 15 and 16. Cylindrical guiding portions 106a and 108a engage continuous annular surface 28 of disk 18 for supporting and guiding the latter within the slot defined by plates 15 and 16. Since cylindrical guiding surface 106a is adjacent plate 15 and since cylindrical portion 108a is spaced from plate 15, disk 18 is supported in the slot defined by plates 15 and 16 in a vertical plane which is tilted or canted (about a vertical axis) with respect to a plane perpendicular to the optical axis of the projector. Plate 15 and conical portion 106b of member 106 act to maintain surface 28 of the disk in guiding engagement with cylindrical guiding surface 106a. Similarly, frusto-conical surfaces 108b of member 108 act to maintain surface 28 of disk 18 in guiding engagement with surface 108a. Surfaces 107a and 107b of member 107 engage peripheral portions of the disk for preventing tilting or rocking of the same about a horizontal axis extending through the disk. Knob-like member 92 also engages the front of disk 18 adjacent the inner portion thereof for preventing wobbling of the disk within the slot defined by plates 15 and 16.

The various support members just described are so arranged that the slide carrying disk is rotatably supported at its periphery for one at a time registry of apertures 35 therein with apertures 57 and 27 formed in respective plates 15 and 16. It will be recalled that since the slides are mounted in corner overlapping relation in the slide carrying disk, the slides are uniformly tilted with respect to a common plate containing the disk. Because the disk is supported in the projector slot in tilted or canted relation with respect to a plane perpendicular to the projector optical axis, as described above, a slide to be projected, i.e. a slide disposed between the apertures 57 and 27 in plates 15 and 16, occupies a plane perpendicular to the optical axis of the projector. This construction prevents distortion of the projected image which would result if the slide being projected were tilted with respect to the optical axis of the projector.

Assuming that the slide carrying disk 18 is mounted in the projector slot with one of the apertures 35 in the disk disposed between apertures 57 and 27 of respective plates 15 and 16, and further assuming that the shutter is in its open position, tip 88c of drive pawl 88 will be disposed adjacent tooth 55 associated with the next slide to be projected, i.e. the next slide proceeding in a clockwise direction, as viewed in FIG. 4, from the slide being projected. When disk 18 is mounted as just described, tip 100a of the stop pawl will be in abutting engagement with the disk tooth 53 which is associated with the slide being projected. When the next slide is to be projected, either by energizing motor 75 or by depressing operating handle 82, movement of the shutter from left to right as viewed in FIGS. 2, 4 and 5, causes drive pawl 88 to rotate the disk 18 in a counterclockwise direction as viewed from the front of the projector. Movement of the shutter causes rotation of operating arm 80 by reason of the engagement of pin 70 with operating lever arm portion 80a. This rotation of operating lever 80 causes plate 97 to be slid from left to right, as viewed in FIGS. 3 and 6, by reason of the engagement between recess 80d and tab 97a. During this initial sliding movement of plate 97, raised portions 97f thereof engage ears 100b of the stop pawl thereby to deflect tab 100a away from the tooth 53 of the slide carrying disk. After raised portions 97f pass ears 100b, the tip 100a of the stop pawl is forced against annular surface 52a on the rear face of the disk by means of the small coil spring 101.

As the shutter moves to its closed position, drive pawl 88 carried thereby advances or shifts the slide carrying disk until tip 100a of the stop pawl engages the next tooth 53 thereby preventing further rotation of the slide carrying disk. Stop pawl 100 and teeth 53 on the disk cooperate in a manner that the disk is stopped with one of the apertures 35 therein in registry or alignment with apertures 57 and 27 of respective plates 15 and 16. When the shutter is retracted or moved to its open position, tip 88c of the drive pawl rides or slides on annular surface 54a until it snaps into the next indentation 54.

Thus it will be seen that as the shutter is reciprocated, either manually or by motor 75, the slide carrying disk is advanced for successively showing the slides carried thereby. Suitable means (not shown) are provided for energizing the cycling motor 75. In a preferred embodiment of the invention, cycling of motor 75 is accomplished from a remote control handpiece.

As best viewed in FIGS. 1 and 7–9, the slide projector includes a handle 110 of inverted U-shape. The handle includes a bight or handgripping portion 111 and leg portions 112. Leg portions 112 are of identical but opposite hand contruction; accordingly, only one leg portion will be described in detail.

Leg portion 112 has the upper end thereof secured, as by means of a fastener 113, to a tab 111a integral with handle portion 111. Leg 112 has a bore 112a in the lower end thereof, which bore mounts a fastener or pin 114. Fastener 114 is received within a generally vertically extending slot 115 formed in a bracket plate 116, which bracket plate may be integral with either of plates 15 or 16. Pin 114 is both rotatable and slidable in slot 115 thereby mounting the handle for both vertical reciprocal sliding movement and also for swinging movement toward the front of the projector. As noted in FIG. 1, the handle 110 is prevented from swinging rearwardly by abutting engagement of legs 112 of the handle with vertically extending grooves 116 formed in rear housing portion 13. By reason of the construction just described, when the slide projector is not in use handle 110 may be positioned for closing the slot defined by plates 15 and 16; the handle is illustrated in this position in solid lines in FIG. 7. When it is desired to insert the slide carrying disk in the projector slot, the handle 110 is lifted slightly and tilted forwardly to the position illustrated in FIGS. 1 and 7.

When it is desired to carry the projector, handle 110 is lifted or slid upwardly with respect to the housing thereby to permit a person to grasp carrying portion 111 of the handle. The sliding engagement between pins 114 and associated slots 115 permit this vertical sliding movement of the handle. As noted in FIGS. 8 and 9, leg 112 of the handle includes a vertically extending recess 112b which recess defines a flange 112c. When the handle is lifted to the carrying position, flanges 112c slidably engage respective oppositely extending wings 118 on the housing thereby to lock the handle against pivoting movement relative to the projector housing. Flanges 112c terminate as indicated at 112d thereby to clear wings 118 when the handle is lowered for allowing the same to be swung or pivoted forwardly as explained above. This locking construction of the handle prevents the projector from rocking or tilting when it is being carried about by a person grasping the handle at portion 111 thereof.

While the invention has been shown in but one form, it will be obvious to those skilled in the art that it is not to be so limited. On the contrary, it is susceptible of various changes and modifications without departing from the spirit and scope of the appended claims.

I claim:
1. A slide carrying disk comprising, a disk having a continuous circular periphery adapting the disk to be rotatably supported by being engaged at such periphery, said disk having a plurality of peripherally arranged apertures therethrough, an equal number of inclined planar surfaces formed on one side of said disk in adjacent relation with respective apertures, all of which planar surfaces are uniformly inclined from a common plane containing the disk, said surfaces being arranged to receive thereagainst a plurality of film slides in corner overlapping relation with the transparent portions of the slides in respective registry with said apertures and with the slides disposed within the peripheral confines of the disk, said disk including a plurality of tabs adjacent each of said planar surfaces for engagement with marginal portions of the slides and said disk further including a concentrically arranged, annular formation of teeth to permit indexing of the disk.

2. A slide carrying disk of unitary construction and comprising, a disk having a continuous circular periphery and having a plurality of separate planar surfaces formed on one side thereof in uniform circumferential spaced relation, all of which planar surfaces are uniformly inclined from a common plane containing the disk and which surfaces adjoin each other to form a plurality of nonradial ledges equal in number with the number of planar surfaces, each of said ledges having its face extending generally perpendicular with the plane containing the disk, said disk including a plurality of generally rectangular apertures formed through respective planar surfaces thereof, each aperture having one corner thereof contiguous with one of the adjacent ledges and each aperture having one edge thereof in parallel spaced relation with the other adjacent ledge, said disk having a plurality of integral tabs adjacent each aperture, which tabs are arranged for engagement with marginal portions of film slides for holding the latter against said planar surfaces with their transparent film portions in registry with respective apertures and with each slide having one edge thereof in abutting relation with the adjacent ledge, and said disk including a concentrically arranged, integral annular formation of teeth on each side thereof.

3. A slide carrying disk of unitary construction and comprising, a disk having a continuous circular periphery and having a plurality of separate planar surfaces formed on one side thereof in uniform circumferential spaced relation, all of which planar surfaces are uniformly inclined from a common plane containing the disk and form respective ledges each extending generally perpendicular with a radius of the disk, which planar surfaces join each other to form other ledges equal in number to the number of planar surfaces, which other ledges are perpendicular with the first mentioned ledges, respectively, all of which ledges have their faces in generally perpendicular relation with the common plane containing the disk, said disk including a plurality of generally rectangular apertures formed through respective planar surfaces thereof, each aperture having one corner thereof contiguous with one of the adjacent other ledges and each aperture having two edges thereof in parallel spaced relation with the adjacent first mentioned ledge and the adjacent other ledge, respectively, said disk having a plurality of integral tabs adjacent each planar surface, which tabs are arranged for engagement with marginal portions of a film slide for holding the latter against said planar surfaces with their transparent film portions in registry with respective apertures and with two edges of each slide in respective abutting engagement with the associated first mentioned ledge and the associated other ledge, at least three of said tabs being associated with each of said planar surfaces, with the first tab being adjacent the first mentioned ledge, with the second tab being adjacent the associated other ledge and with the third tab being in oppositely disposed relation with said second tab, said second and third tabs being constructed for yieldable sliding engagement with respective opposite marginal portions of a film slide, said third tab being associated with a shoulder arranged for abutting engagement with the edge of the film slide opposite the edge thereof in abutting engagement with the associated other ledge.

4. A slide carrier of unitary construction comprising, a thin generally planar member having at least one continuous, uninterrupted, peripheral supporting surface, said member including a plurality of equally spaced apertures, which apertures are also uniformly spaced from said supporting surface, said member further including a plurality of planar surfaces formed on one face thereof and in adjacent relation with said apertures, all of which planar surfaces are uniformly inclined from a common plane containing said member, said planar surfaces being arranged to receive thereagainst a plurality of film slides in partial marginal overlapping relation with the transparent portions of the slides in respective registry with said apertures, said member including at least one tab adjacent each planar surface thereof for engagement with marginal portions of the slides, and said member further including an elongated formation of teeth extending in uniform spaced relation with said supporting surface to permit indexing of said member.

5. A slide carrier comprising, a thin generally planar member having at least one continuous, uninterrupted, peripheral supporting surface, a plurality of equally spaced, generally rectangular apertures formed in said member, which apertures are also uniformly spaced from said surface, said member including on one face thereof a plurality of planar surfaces adjacent respective apertures, which planar surfaces are uniformly inclined from a common plane containing said member and which planar surfaces adjoin each other forming a plurality of ledges equal in number to the number of planar surfaces, each ledge having its face extending generally perpendicular to the plane containing the member, each aperture having one edge thereof in parallel relation with the adjacent ledge, said planar surfaces being arranged to receive thereagainst a plurality of film slides with the transparent film portions thereof in respective registry with said apertures, with each slide having an edge thereof in abutting engagement with the associated ledge, and with adjacent slides being in marginal overlapping relation, and said member having a plurality of tabs adapted for engagement with marginal portions of the slides for holding the same against respective planar surfaces, and said member further including an elongated formation of teeth extending in uniform spaced relation with said supporting surface to permit indexing of said member.

6. In combination, a slide carrying disk having a continuous circular periphery and a plurality of circumferentially spaced apertures formed therethrough, said disk including means for removably mounting a plurality of film slides in corner overlapping relation with the transparent film portions of the slides in respective registry with said apertures whereby the slides are uniformly inclined from a comomn plane containing the disk, a slide projector having means defining the optical axis of the projector, said projector having disk supporting means including a pair of vertical, parallel, spaced walls extending generally perpendicular to the optical axis, which walls define a slot having the lowermost portion of said disk received therein, said disk supporting means also including periphery engaging means extending between said walls, which last mentioned means are in engagement with the periphery of said disk, said disk supporting means supporting said disk for one at a time alignment of said apertures with the optical axis of the projector and also supporting the disk in a substantially vertical plane inclined with respect to the optical axis so that a slide carried by the disk occupies a plane perpendicular to the optical axis when the slide is in registry with the optical axis.

7. In combination, a slide carrying disk having a continuous circular periphery and a plurality of circumferentially spaced apertures formed therethrough, said disk including means for removably mounting a plurality of film slides in corner overlapping relation with the transparent portions of the slides in respective registry with said apertures whereby the slides are uniformly inclined from a common plane containing the disk, a slide projector having means defining the optical axis of the projector, said projector having disk supporting means including a pair of vertical, parallel, spaced walls extending generally perpendicular with the optical axis, which walls define a slot having the lowermost portion of said disk received therein, at least a pair of members supported between said plates one on each side of the projector optical axis, each of said members having a guiding surface in supporting engagement with the periphery of said disk thereby supporting the same in a substantially vertical plane for one at a time alignment of said apertures with said optical axis, the guiding surface of one of said members being nearer one of said plates then the guiding surface of the other member thereby to support the disk in inclined relation with the optical axis so that a slide carried by the disk occupies a plane perpendicular to the optical axis when the slide is in registry with the optical axis.

8. The combination according to claim 7 wherein each of said members includes a central axis perpendicular with said plates, said one member having an axially extending cylindrical portion and an adjacent coaxial frusto-conical portion, which cylindrical portion is adjacent said one plate and defines the guiding surface of said one member, and which frusto-conical portion has the larger end thereof adjacent the other plate, said other member having a cylindrical portion joining at its ends with respective coaxial frusto-conical portions, which last mentioned frusto-conical portions have their larger ends adjacent respective plates and which last mentioned cylindrical portion defines the guiding surface of said other member.

9. A slide projector comprising, a housing and means therein defining the optical axis of the projector, a pair of vertical, parallel, spaced frame plates extending generally perpendicular with the optical axis, which frame plates define a slot opening exteriorly of the housing and adapted to receive therein at least a portion of a slide carrier of the type which carries a plurality of film slides in generally coplanar relation, means between said frame plates for movably supporting a slide carrier of the type described, said frame plates having aligned openings with the optical axis extending therethrough, a shutter plate and means supporting the same in adjacent parallel relation with one of said frame plates for reciprocal sliding movement to and from a position wherein a shutter plate covers the opening in said one frame plate, means for reciprocating said shutter plate, a drive pawl carried by said shutter plate and extending into said slot, which drive pawl is adapted to cooperate with a formation of teeth on the slide carrier to shift the latter upon reciprocation of the shutter plate, a stop pawl mounted on one of said frame plates and being adapted to cooperate with another formation of teeth on the slide carrier.

10. A slide projector comprising a housing enclosing means defining the optical axis of the projector, said housing including spaced, parallel walls extending transversely to the optical axis, which walls define a slot opening exteriorly of the housing for receiving a slide carrier of the type adapted to support a plurality of film slides in generally coplanar relation, means in said slot for removably supporting a slide carrier of the type described, and a handle extending transversely of said housing and mounted on the latter by sliding-pivot means, said sliding-pivot means supporting said handle in a position wherein the latter covers said slot and slidably supporting the handle for vertical upward movement to a carrying position, said sliding-pivot means also pivotally supporting said handle for swinging movement to one side of said slot thereby to expose the latter for receiving the slide carrier.

11. A slide projector comprising, a housing enclosing means defining the optical axis of the projector, said housing including spaced, parallel walls extending transversely to the optical axis, which walls define a slot opening exteriorly of the housing for receiving a slide carrier of the type adapted to support a plurality of film slides in generally coplanar relation, means in said slot for removably supporting a slide carrier of the type described, said projector having opposite sides each including means defining a generally vertically extending recess, which recesses are adjacent respective opposite ends of said slot, a handle of inverted U-shape and including pin means at the distal ends thereof, which pin means are slidably and pivotally received in respective recesses, said pin means being slidable in respecitve recesses to support the handle for vertical movement between a lowermost position wherein the handle covers said slot and an uppermost carrying position wherein the bight portion of the handle is in vertical spaced relation with the slot, and said pin means being rotatable in respective recesses to allow said handle to be swung from said lowermost position to one side of said slot thereby to expose the latter for reception of a slide carrier.

12. The slide projector according to claim 11 wherein said housing and the leg portions of said handle include tongue and groove means which are engageable for preventing swinging movement of the handle when the latter is raised to its uppermost carrying position.

References Cited

UNITED STATES PATENTS

| | | | |
|---|---|---|---|
| 1,645,204 | 10/1927 | Nothstine | 88—27 |
| 2,095,171 | 10/1937 | Cook | 88—27 |
| 2,773,323 | 12/1956 | Gorwitz | 88—27 |
| 2,916,964 | 12/1959 | Paulsohn | 88—27 |

NORTON ANSHER, *Primary Examiner.*

R. M. SHEER, *Assistant Examiner.*